United States Patent [19]

Puccinelli

[11] Patent Number: 4,586,842
[45] Date of Patent: May 6, 1986

[54] SCAFFOLD JOINT FOR A SCAFFOLD STRUCTURE

[75] Inventor: Joseph S. Puccinelli, Milwaukee, Wis.

[73] Assignee: Figgie International, Inc., Ohio

[21] Appl. No.: 768,876

[22] Filed: Aug. 23, 1985

[51] Int. Cl.$^4$ .......................... E04G 7/00; F16B 9/00
[52] U.S. Cl. ..................................... 403/246; 403/49; 403/317; 182/178
[58] Field of Search ................. 403/49, 246, 317, 409; 182/178, 179

[56] References Cited

U.S. PATENT DOCUMENTS

| 4,369,859 | 1/1983 | Smits | 403/49 X |
| 4,439,052 | 3/1984 | Wallther | 182/179 X |
| 4,445,307 | 5/1984 | Puccinelli et al. | 403/49 X |

FOREIGN PATENT DOCUMENTS 2352194 12/1977 France ................................. 403/49

Primary Examiner—Andrew V. Kundrat
Attorney, Agent, or Firm—Michael, Best & Friedrich

[57] ABSTRACT

A scaffold joint for connecting the ends of horizontal scaffold members to vertical scaffold members. Spaced pairs of ring support members are fastened to the vertical scaffold members by welding or other suitable means. End connector assemblies are fastened to the ends of the horizontal scaffold members. Each of said end connector assemblies includes an end connector member and a locking assembly slidably mounted thereon. Each locking assembly is comprised of a wedge member and a wedge retainer member. The wedge retainer member is free floating relative to the wedge member and cooperates with a bolt to prevent inadvertent dislodgement of the assembly. Each end connector member has a pair of ring engaging portions adapted for engagement with the spaced ring support members on said vertical scaffold members. The locking assemblies are adapted when moved to their locked position to make tight wedging contact with a ring support member, thereby causing the ring engagement portions on the end connector members to be forced into tight engagement with the ring support members to thereby lock the horizontal scaffold member to the vertical scaffold members.

7 Claims, 9 Drawing Figures

U.S. Patent May 6, 1986 Sheet 1 of 2 4,586,842
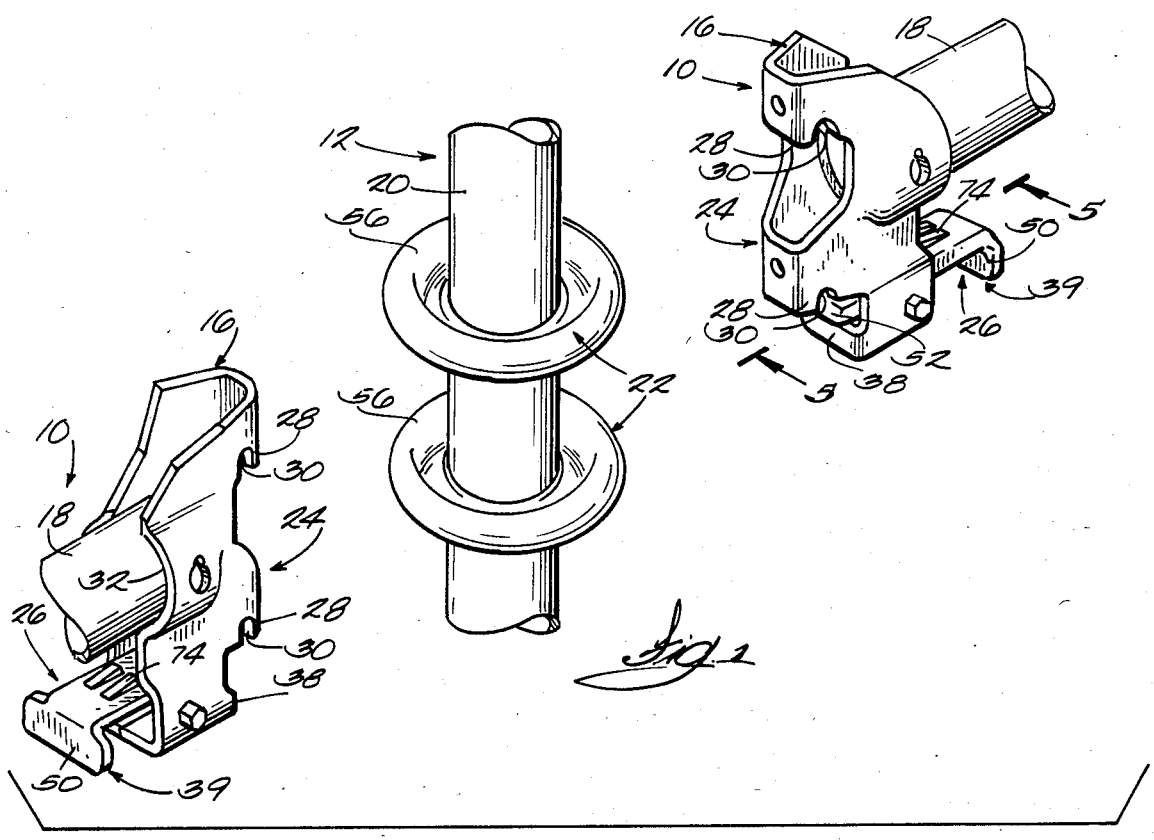
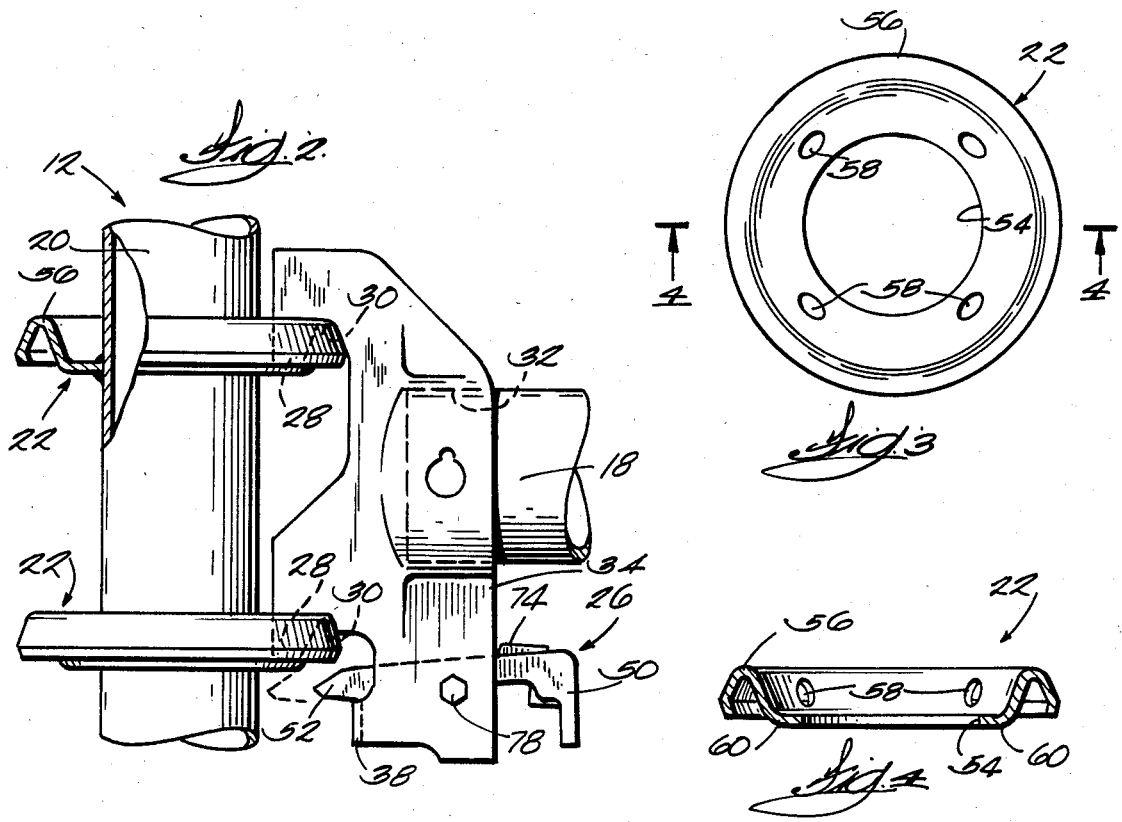

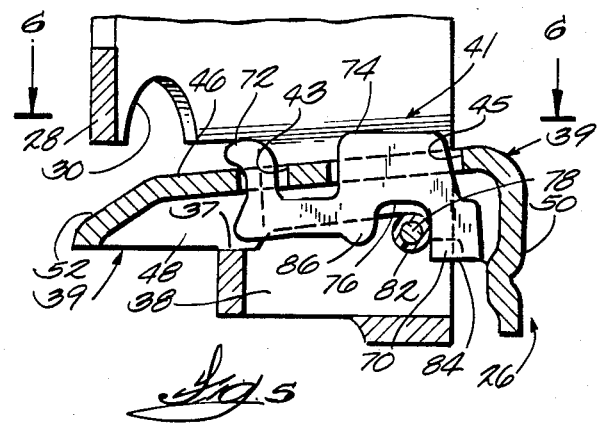
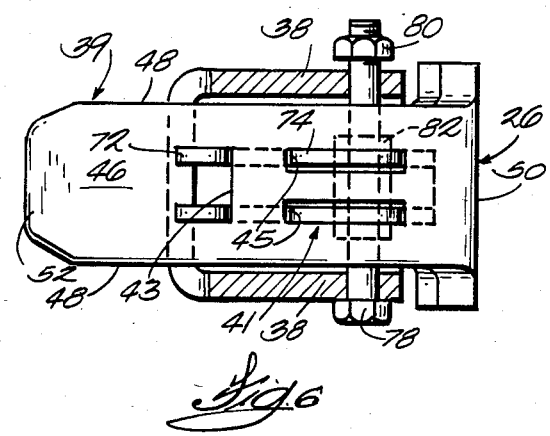
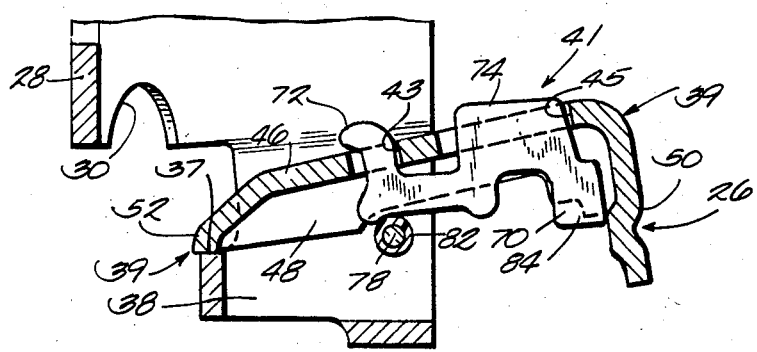
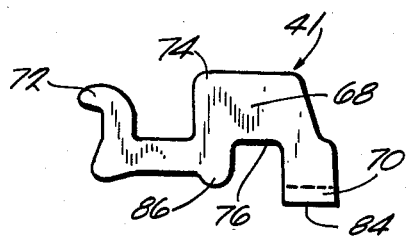
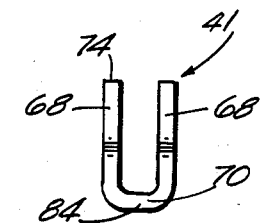

SCAFFOLD JOINT FOR A SCAFFOLD STRUCTURE

FIELD OF THE INVENTION

This invention relates to scaffolding and more particularly to a scaffold joint for connecting the ends of horizontal scaffold members to vertical scaffold members.

DESCRIPTION OF THE PRIOR ART

The scaffold joint of the present invention is an improvement of the scaffold joint shown in U.S. Pat. No. 4,445,307. The improvement resides in an improved locking wedge assembly which locks the horizontal scaffold members to the vertical scaffold members. The improved structure provides a positive locking action for the locking wedge assembly when in the locked position. The improved structure also prevents the wedge assembly from inadvertently moving forward to its locked position during handling. In the improved construction the wedge assembly can be moved forwardly only by the application of a positive force applied to it.

SUMMARY OF THE INVENTION

The improved locking wedge assembly of the present invention is comprised of a wedge member and a wedge retainer member. The wedge retainer member is free-floating relative to the wedge member and cooperates with a bolt member mounted in the end connector member to prevent inadvertent dislodgement of the locked wedge assembly in use.

DESCRIPTION OF THE DRAWINGS

FIG. 1 is a perspective view of a scaffold joint made in accordance with the present invention.

FIG. 2 is a side elevation view of a horizontal runner assembly connected to a vertical support member; (unlocked position)

FIG. 3 is a plan view of a ring member 22;

FIG. 4 is a sectional view taken along line 4—4 of FIG. 3;

FIG. 5 is a fragmentary sectional view taken along line 5—5 of FIG. 1; (locked position)

FIG. 6 is a sectional view taken along line 6—6 of FIG. 5;

FIG. 7 is a view similar to FIG. 5 but with the wedge assembly in its retracted-unlocked position;

FIG. 8 is a side elevation view of the wedge retainer member; and

FIG. 9 is an end view of the retainer member shown in FIG. 8.

DESCRIPTION OF THE PREFERRED EMBODIMENT

As best shown in FIG. 1, the scaffold joint of the present invention is comprised of horizontal assemblies 10 and a vertical support assembly 12. Each horizontal assembly 10 is comprised of two basic parts, namely, a horizontal support member 18 and a pair of end connector assemblies 16 mounted on opposite ends thereof. Each vertical support assembly 12 is comprised of a vertical support member 20 and a plurality of spaced ring support members 22, 22 mounted thereon. Each end connector assembly 16 is comprised of an end connector member 24 and a locking wedge assembly 26. As will be explained hereinafter, a typical scaffold structure would employ a plurality (up to 8) horizontal assemblies 10 attached to each pair of ring support members 22, 22 of a vertical support assembly 12. Each end connector member 24 has a pair of downwardly extending tongue portions 28, 28 and a pair of downwardly opening grooves 30, 30 adjacent tongues 28, 28. Member 24 is also provided with a socket 32 formed in one end thereof to receive the end of a horizontal support member 18. In the preferred embodiment, support members 18 are secured by welding.

The lower portion 34 of each end connector member 24 is formed to accommodate a locking wedge assembly 26 (see FIGS. 5 and 6). More specifically, portion 34 is comprised of side walls 38, 38.

As shown in FIGS. 5 and 6, locking wedge assemblies 26 are comprised of a wedge member 39 and a wedge retainer member 41. Wedge member 39 is comprised of a sloping top portion 46, side walls 48, 48 a depending end wall 50 and an angled nose portion 52. Wedge member 39 is also provided with pairs of slotted openings 43 and 45.

As best shown in FIGS. 8 and 9 wedge retainer member 41 is comprised of a pair of side walls 68, 68 connected by a bottom wall 70. The bottom wall 70 has a downwardly facing surface 84 thereon. Side walls 68, 68 are provided with pairs of upstanding nose portions 72 and 74 which register with slots 43 and 45 when the parts are in assembled position (FIG. 5). Side walls 68, 68 are also provided with grooves 76 and adjacent bump portions 86 on the underside of the walls.

The locking wedge assembly is mounted and retained in place by a retaining bolt 78 and a lock nut 80. A plastic tube 82 is mounted on the bolt.

The parts are assembled by positioning the parts as shown in FIG. 5 and then installing the bolt 78 and nut 80. As shown in FIG. 5 the retainer member 41 is free-floating and is captured in the wedge member by slots 43, 45. The bolt and lock nut 78 and 80 serve to retain the entire assembly 26 in the lower portion 34 of the end connector member 24.

As shown in FIGS. 3 and 4, ring support members 22 are of a circular configuration and have a circular opening 54 in the center thereof. As shown in FIG. 4 each ring 22 is provided with an upstanding nose portion 56 extending around the periphery thereof. Rings 22 are also provided with a plurality of drain opening 58. The underside of rings 22 are curved as at 60 adjacent nose portion 56. Rings 22 are assembled on a vertical support member 20 in spaced relationship as shown in FIG. 1 and then permanently fastened thereto by welding.

OPERATION

FIGS. 2 and 7 show the locking wedge assembly 26 in its unlocked, retracted position. The end connector 16 is positioned on a pair of spaced support rings 22 with the nose portion 56 on each ring 22 seated in groove 30 in the connector member 24. When so positioned, tongues 28, 28 on the connector member 24 fit snugly around the inside nose portions 56.

To lock the horizontal runner 10 to the vertical support 12, locking wedge assembly 26 is forced inwardly toward the vertical support assembly 12. This is done by striking wedge end wall 50 with a suitable tool such as a hammer. As the wedge is forced into locking position, sloping top portion 52 thereof will slide into contact with surface 60 on the underside of the lower support ring 22 and in contact with surface 37 on the end connector member 34 to thereby exert a downward force on the connector member 24. Such downward force will force nose portions 56 on rings 22 into a tight engagement in grooves 30 in the end connector member to thereby securely lock the horizontal assembly 10 into the vertical support assembly 12.

Once nose portion 52 is seated under a ring 22, retainer member 41 will drop downwardly due to the force of gravity to the position shown in FIG. 5. In such position groove 76 will engage with tube 82 on bolt 78 to thereby capture the wedge member 39 in the lock position.

To retract the wedge assembly 26 to its unlocked position (FIG. 7), it is first necessary to pivot the wedge retainer upwardly so that groove 76 therein will clear the top of tube 82 on bolt 78. This can be accomplished by a special tool designed to be inserted under the wedge assembly for contact with surface 84 on the retainer member. Upward pressure exerted on surface 84 will force member 41 upwardly to the release position. With the retainer 41 in such release position the assembly can be retracted by applying force to the inside of end wall 50 on wedge member 39.

It will be appreciated from the foregoing that with wedge assembly 26 in its retracted unlocked position (FIG. 7), the bumps 86 on the bottom of the retainer member will prevent the wedge assembly from inadvertently moving forward to its lock position during handling. In other words, because of the blocking relationship of the tube 82 with respect to the bumps 86, the wedge assembly can be moved forwardly only by the application of a positive force on wall 50 sufficient to cause bumps 86 to deform the plastic tube 82. As indicated this relationship prevents inadvertent movement of the wedge assembly into its lock position during handling of the component scaffold parts.

I claim:

1. A scaffold joint for connecting the ends of a horizontal scaffold member to a vertical scaffold member comprising:
    a pair of ring support members fastened to the vertical scaffold member in a vertically spaced relationship;
    an end connector assembly fastened to the end of a horizontal scaffold member, said end connector assembly comprised of an end connector member and a locking wedge assembly slidably mounted thereon, said end connector member having a pair of ring engagement portions adapted for removable engagement with said spaced ring support members, said locking wedge assembly adapted when moved to its locked position to make tight contact with one of said ring support members to thereby cause said ring engagement portions to be forced into tight contact with said ring support members;
    said locking wedge assembly including a wedge member and a wedge retainer member, said wedge retainer member is free floating relative to said wedge member and cooperates with a bolt member mounted in said end connector member to prevent inadvertent dislodgement of the locked wedge assembly in use.

2. A scaffold joint according to claim 1 in which said wedge retainer member will move downwardly by the force of gravity into engagement with said bolt member when the parts are moved into locked position.

3. A scaffold joint according to claim 2 in which said wedge retainer member has a downwardly opening groove therein which registers with said bolt member when the parts are in locked position.

4. A scaffold joint according to claim 3 in which said wedge retainer member is moved upwardly against the force of gravity to disengage said groove from said bolt to thereby permit movement of said locking wedge assembly from its locked to its unlocked position.

5. A scaffold joint according to claim 4 in which said lock wedge assembly further includes a plastic tube mounted on said bolt member, said plastic tube adapted to prevent inadvertent movement of said lock wedge assembly into its locked position during handling.

6. A scaffold joint according to claim 5 in which said plastic tube is deformed by said wedge retainer member when said locking wedge assembly is moved from its unlocked to its locked position.

7. A scaffold joint according to claim 1 in which said wedge retainer member has pairs of upstanding nose portions which register with pairs of slotted openings in said wedge member.

* * * * *